United States Patent Office 3,317,999
Patented May 9, 1967

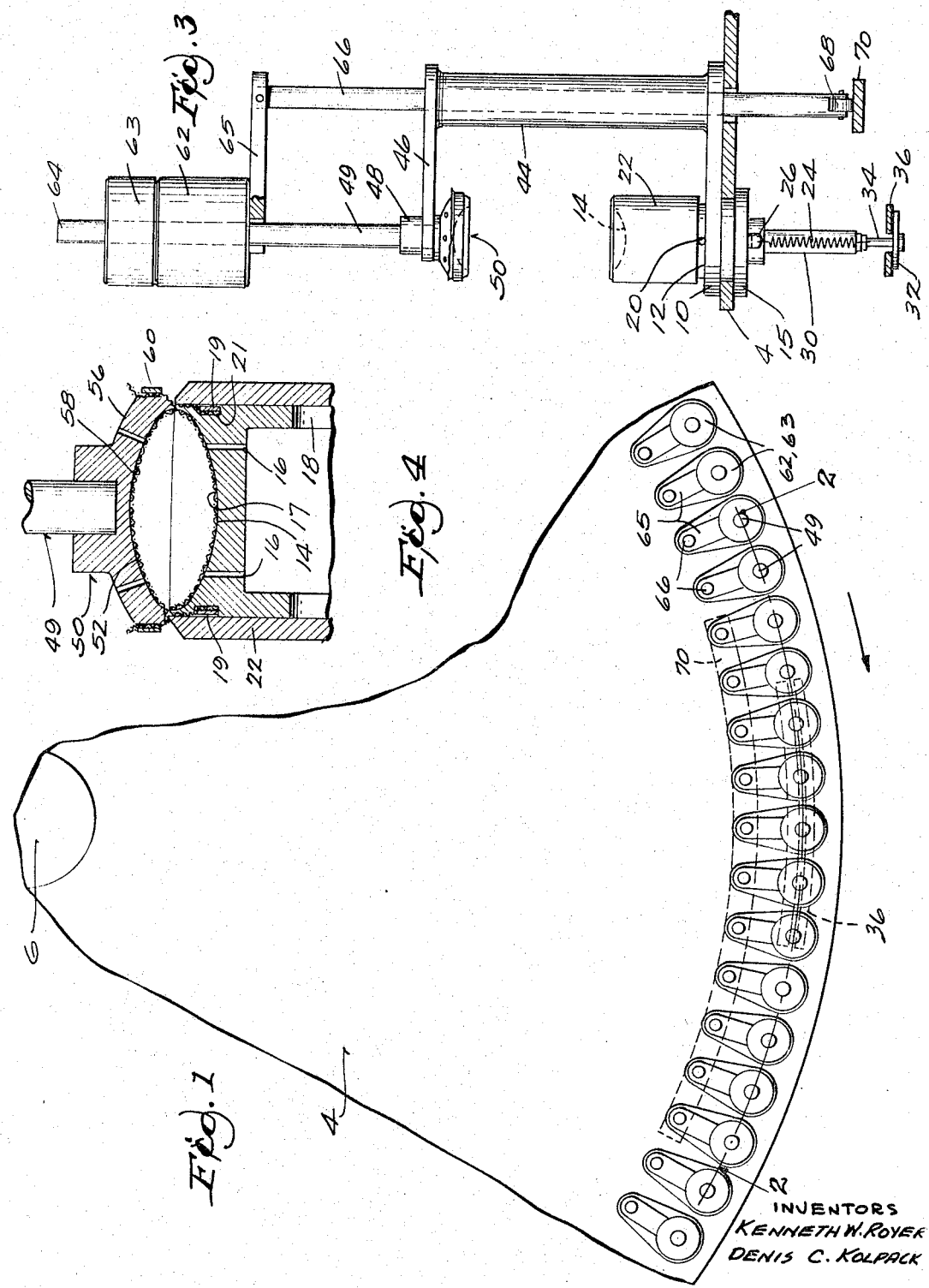

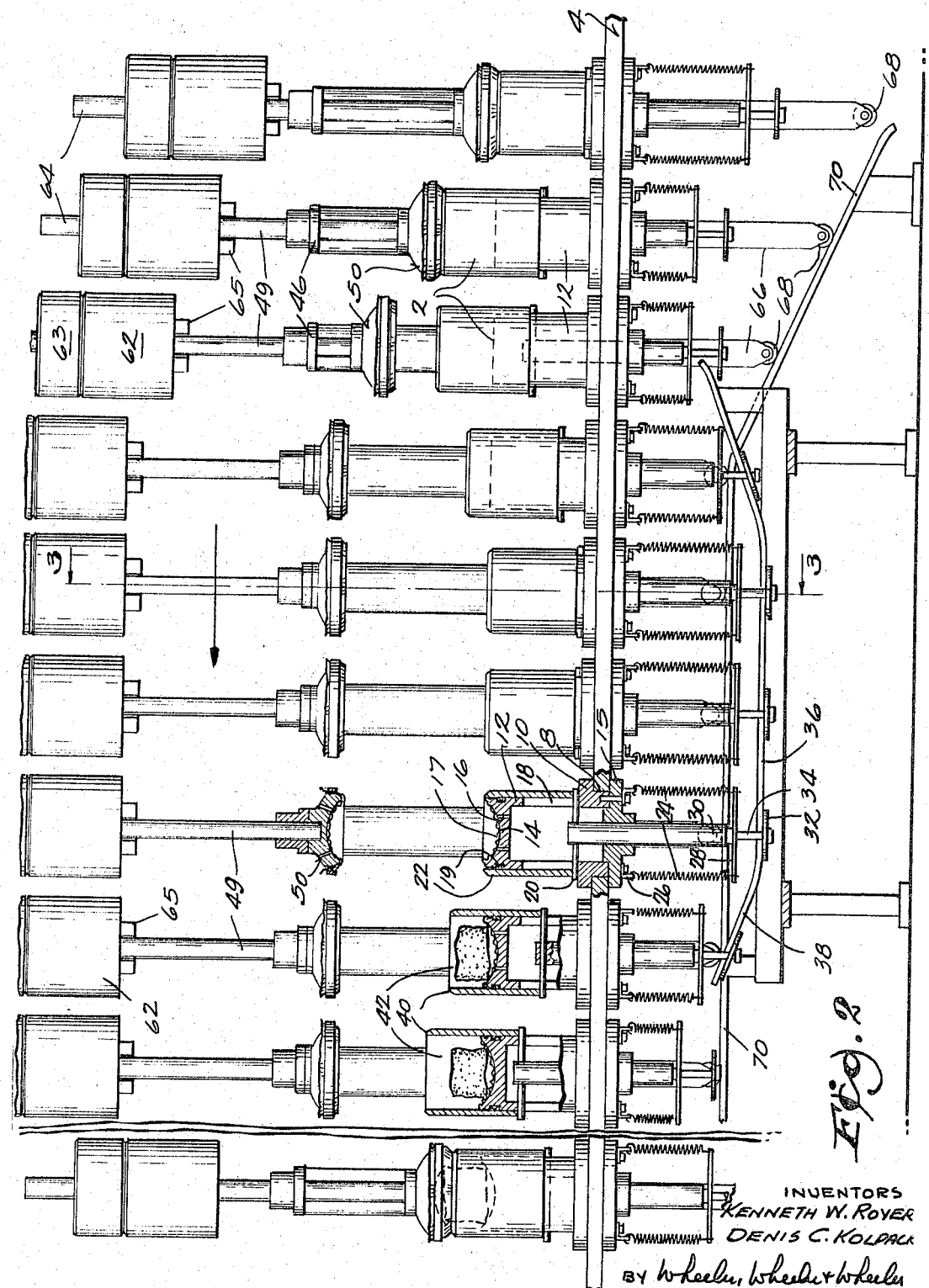

3,317,999
CHEESE MOLDING PRESS
Kenneth W. Royer and Denis C. Kolpack, Mayville, Wis., assignors to Purity Cheese Company, Mayville, Wis., a corporation of Wisconsin
Filed Oct. 23, 1965, Ser. No. 503,181
10 Claims. (Cl. 31—44)

This invention relates to a cheese molding press which is an improvement on that disclosed in our Patent 3,008,235.

The instant device differs from that of the patent specifically in the manner in which the mold elements are actuated and in the fact that the sleeve which confines the curd pending the closing of the mold elements thereon telescopes on the lower mold element and is spring-supported to be elevated to provide a pocket in which the curd is placed on the lower mold. It is no longer necessary to use care in pre-forming the curd or in placement thereof. Just dropping it in the pocket is enough. The sleeve is pushed downwardly out of the way as the upper mold element descends under the bias of a weight which is variable to suit the requirements of the particular curd which is being molded.

The press "cloths" of the instant device are attached directly to the respective mold elements. While reference is made to them as press cloths, to conform to the usage of the art, the fact is that they are fillers which need not necessarily be cloth but may comprise screens fabricated of metal or paper or plastic or other materials. They are much longer-lasting by reason of the fact that they are not subject to abrasive friction in each operation, as is the cloth fastened to the sleeve in the device of our former Patent 3,008,235.

Moreover, the direct connection of these cloths or screens to the respective molds eliminates the slack and consequently the wrinkle marks resulting from the use of previously known cloths.

Although there is not normally a great deal of whey that moves upwardly through the openings in the upper mold, it is advantageous in the instant device that such whey as moves upwardly is immediately discharged instead of being confined on the surface of the upper mold. In the instant device, the upper mold is relatively thin and its upper surface may have downward convex or conical inclination, there being in any event nothing to confine the whey.

In addition to the foregoing points, the objects of the invention include an increase in speed of operation without using additional personnel. Potential automatic loading and unloading is also an objective. Because of the increased production of the device, this has not yet been incorporated but the above noted arrangements for confining the curd on the lower mold during loading and exposing it fully on completion of the cycle were factors designed with automation in mind.

In the drawings:

FIG. 1 is a fragmentary plan view of a rotary cheese mold press embodying the invention.

FIG. 2 is a developed view partially in side elevation and partially in section on the line 2—2 of FIG. 1.

FIG. 3 is a view in transverse section through the line 3—3 of FIG. 2.

FIG. 4 is a fragmentary detail view showing mold press parts in section.

As in the drawings of our former Patent 3,008,235, the instant device is assembled on a turntable 4 rotatable on a center bearing 6. Details of the means for operating the turntable are not shown. Physically, it is a much larger machine than that shown in our former patent. By way of example, and not by way of limitation, the table of the instant machine is ten feet in diameter and it carries sixty-four molds and rotates approximately 1 r.p.m.

Angularly spaced about the table in proximity to its outer periphery are the openings 8 in which are positioned shouldered mounting rings 10 for the tubular supports 12 for the lower concave molds 14. A clamping disk 15 bolted to each ring 10 holds the ring 10 to the table.

The molds have perforations 16 to permit the escape of whey from the cheese curd which is being molded. The drain holes or ports 16 are covered by any appropriate press cloth 17, the margins of which are anchored by a retaining ring 19 encircling the mold in a peripheral channel 21 with which the mold is provided. The filter 17 need not be a woven fabric. Substitutes made of other materials have been used.

Each tubular support 12 has vertical slots 18 for a cross head 20 which raises and lowers the curd-confining sleeves 22. The sleeves are normally held in a relatively elevated position by the bias of tension springs 24 anchored to the bolts 26 and to a spring seat member 28 at the lower end of a connecting rod 30 to which the cross head 20 is attached.

As the table 4 is rotated by a conventional means comparable to that disclosed in Patent 3,008,235, a cam follower 32 carried by connecting rod extension 34 engages a fixed cam 36 that extends arcuately beneath the path of travel of the several connecting rods and is formed to hold the sleeve 22 retracted against the bias of spring 24 for the purpose of exposing for withdrawal by the operator the cheese which has been molded and which is resting on the top of the concave lower mold 14. In order to expose the cheese mold for withdrawal, it is not only necessary to retract the sleeve but also to raise the upper mold, as hereinafter explained.

After the operator has had opportunity to withdraw the molded cheese, the cam 36 inclines upwardly at 38 and allows the confining sleeve 22 to rise to the position shown at the left in FIG. 2. The upper end 40 of the sleeve now extends well above the mold 14 and forms a pocket 42 into which a predetermined mass of unmolded cheese curd may be placed. The provision of this pocket makes it unnecessary for the curd to be pre-molded in any particular form or to be placed in any particular position. This is a significant advantage in the operation of a molding press of this character.

Mounted on the table 4 immediately at the rear of each of the openings 8 is a column 44 having an arm 46 that extends over the table opening 8 and has a bearing 48 for the bar 49 upon which the upper mold 50 is carried. This mold has a downwardly concave cavity at 52 which is complementary to the cavity of the lower mold 14. The ports for the escape of whey extend upwardly from this cavity to an upper surface 56 from which the whey freely drains. It may be convex or concave if desired, and, in any event, is open marginally. A filter cloth (this term including metal, paper and synthetic substitutes above described) is provided at 58 and anchored by a ring 60 which encircles the upper mold 50.

The bar 49 upon which the upper mold 50 is mounted is subject to the bias of the weight or weights 62, 63. The amount of bias imposed on the upper mold will depend upon the particular characteristics of the curd which is being processed. The arrangement is such that weights can be added or subtracted. The weights are annular and they slide onto the upper end 64 of bar 49, being supported by the arm 65 which is attached to the bar 49 and carried by a push rod 66 reciprocable through the column 44.

Reciprocation of the push rod is controlled by cam follower roller 68 that engages a cam track 70 extending arcuately about the path of movement of the several cam followers 68 as these rotate with the table 4.

At the time the sleeve 22 is held retracted to expose the molded cheese resting on the lower mold 14 as above described, the upper mold 50 is elevated by engagement of cam follower 68 with cam track 70, thus leaving the cheese on the lower mold 14 fully exposed.

The arcuate extent of the cam track 70 is such that after a fresh charge of curd has been placed into the pocket 42 as above described, the cam 70 permits the follower 68 to lower the push rod 66 and the upper mold 50 under the bias of the weights 62, 63. This bias greatly exceeds the tension bias of the springs 24. Consequently, as the upper mold descends, it first engages the top margin 40 of the advanced sleeve 22 and pushes the sleeve downwardly, tensioning spring 24.

In the course of the downward movement of the upper mold 50, pushing the sleeve 22 ahead of it, the upper mold engages and starts to form the curd which has been introduced into the pocket 42 and is supported on the lower mold 14. Ultimately, the curd substantially completely fills the space between the two molds, being confined from escaping laterally by the sleeve 22 (with which the upper mold 50 is engaged). Under the pressure of the weights 62, 63 by which the upper mold 50 is biased, the curd will be compacted and the whey expressed therefrom. Finally, the molds will be approximately, if not completely, in contact with each other to produce a molded cheese of the desired form.

Pressure on the molded curd continues through the entire circuit of the machine in order to give ample time for the curd to be compressed and for the whey to escape. As has already been pointed out, the upper mold is lifted and the sleeve held in its retracted position to fully expose the molded cheese as the operator's station is approached.

We claim:
1. A cheese molding press comprising the combination with a rotary table, of an annular series of concave lower molds mounted on the table, a corresponding series of complementary upper molds respectively having means for raising and lowering them with respect to the lower molds, confining sleeves surrounding said molds and being telescopically reciprocable between advanced and retracted positions with respect to the lower molds, and respective means for operating the sleeves and the upper molds in a sequence in which the sleeves are advanced above the lower molds to receive curd to be molded and the upper molds are thereupon lowered toward the lower molds, the sleeve moving downwardly toward its retracted position while confining the curd on the lower molds, the upper molds being raised and the sleeves being held retracted to expose the molded cheese after predetermined circuit of said table.

2. A press corresponding to claim 1 in which each lower mold is mounted on a tubular support upon which the respective sleeve is guided, said operating means including spring means below the table biasing the sleeve in an upward direction upon said support and motion connections from the spring means to the sleeve for transmitting spring bias to the sleeve, said connections including a cam follower, there being a cam in the path of movement of the cam follower for holding said sleeve retracted on said support to a lowered position at which said lower mold is exposed.

3. A press according to claim 2 in which said motion transmitting connections include a cross head connected with the sleeve and extending through slot means with which the tubular support for the lower mold is provided, a connecting rod connected with the cross head, a spring anchorage attached to the connecting rod, tension spring means between the table and the anchorage, and a connecting rod extension provided with the cam follower aforesaid.

4. A molding press comprising the combination with a rotatable table having an arcuate series of apertures adjacent its periphery, of tubular supports mounted on the table in registry with each of said apertures and provided with upwardly concave lower molds in positions elevated above the table, sleeves surrounding said molds and being guided on the respective supports for reciprocation in a range in which the sleeves expose the lower mold in a retracted sleeve position and provide a pocket above the lower mold in an advanced sleeve position, spring means connected between the table and the respective sleeves for biasing them toward said advanced positions, a cam follower connected with each sleeve, a cam engageable by successive cam followers for holding the respective sleeves in their retracted positions as the table rotates, an upper mold complementary to each lower mold and having means guiding it for movement to and from molding position as the table rotates, said upper mold being gravity biased in one direction of its movement and having means for mechanically actuating it against such bias in the opposite direction of its movement.

5. A press according to claim 4 in which the lower mold has an external peripheral channel, a filter seated on the lower mold having portions extending into said channel, and a retaining ring encircling the lower mold in the channel for holding the filter, said lower mold having whey escape ports for whey compressed from the molded curd and passing through said filter.

6. A press according to claim 4 in which the tubular support for the lower mold is slotted, the connection between each sleeve and its said spring includes a cross head connected with the sleeve and passing through the slots, a connecting rod secured to the cross head and passing through the table, a spring anchorage carried by the connecting rod below the table, and tension springs connected between the table and the spring anchorage and constituting means for biasing the sleeve toward its advanced position.

7. A press according to claim 4 in which the tubular support for the lower mold is slotted, the connection between each sleeve and its said spring includes a cross head connected with the sleeve and passing through the slots, a connecting rod secured to the cross head and passing through the table, a spring anchorage carried by the connecting rod below the table, and tension springs connected between the table and the spring anchorage and constituting means for biasing the sleeve toward its advanced position, said connecting rod having an extension upon which the said cam follower is mounted in a position for engagement by said cam.

8. A press according to claim 4 in which the table has a column in proximity to each lower mold and an arm at the top of each column having a bearing axially alinged with the lower mold, a bar reciprocable in the bearing, said upper mold being mounted on the bar for reciprocation toward and from the lower mold, the means for moving it to and from molding position including a fixed cam and a cam follower connected with the bar for the actuation thereof and positioned to be engaged by said cam as the table rotates.

9. A press according to claim 8 in which said upper mold and bar are subject to gravity bias of weights interchangeably mounted on the upper mold.

10. A cheese molding press comprising the combination with a rotatable table, of supports mounted on the table in arcuate series, upwardly concave lower molds mounted on the supports and each provided with whey drain ports and with filters spanning said ports, sleeves closely fitted around said lower molds and reciprocable telescopically with respect thereto between retracted positions in which the respective molds are exposed and advanced positions in which the sleeves form pockets having respective molds at their bottoms, connecting rods attached to the sleeves and extending downwardly to positions below the table, tension springs connected between the connecting rods and the table and biasing the connecting rods and sleeves in a direction to move the sleeves in their advanced positions, a cam follower connected with each connecting rod, the cam fixed beneath the path of respective connecting rods and adapted to act thereon in the course of table rotation in a direction to hold the respective connecting rods to maintain respective sleeves in their retracted positions, a column carried by the table adjacent each lower mold, a downwardly concave upper mold having means for guiding it from the column for reciprocation toward and from the lower mold, the upper mold being complementary to the lower mold and having whey escape ports and filter means, means for biasing the respective upper molds with a pressure sufficient to displace respective sleeves toward their respective retracted positions, the sleeves being engaged by the upper mold as the latter reciprocates toward its respective lower mold, and cam means operative in the rotation of the table for raising successive upper molds away from their respective lower molds in a sector of table rotation in which the sleeves are held in their retracted positions with respect to the lower molds, whereby work pressed between said molds is exposed on the lower mold.

References Cited by the Examiner

UNITED STATES PATENTS

| | | | |
|---|---|---|---|
| 2,459,205 | 1/1949 | Wells et al. | 18—34 |
| 2,582,922 | 1/1952 | Crowley et al. | 18—34 |
| 2,879,593 | 3/1959 | Schwartz | 31—8 |
| 3,008,235 | 11/1961 | Royer et al. | 31—44 |
| 3,041,153 | 6/1962 | Elder et al. | 31—89 |
| 3,096,540 | 7/1963 | Miller et al. | 17—32 |
| 3,098,297 | 7/1963 | De Boer | 31—44 |

SAMUEL KOREN, *Primary Examiner.*

ALDRICH F. MEDBERY, *Examiner.*